UNITED STATES PATENT OFFICE.

MICHAEL F. COUGHLIN, OF STOUGHTON, MASSACHUSETTS, ASSIGNOR TO FREDERIC H. KENNARD, OF NEWTON CENTER, MASSACHUSETTS.

VARNISH AND PROCESS OF MAKING SAME.

1,103,266.   Specification of Letters Patent.   Patented July 14, 1914.

No Drawing.   Application filed February 2, 1914.   Serial No. 816,048.

*To all whom it may concern:*

Be it known that I, MICHAEL F. COUGHLIN, a citizen of the United States, residing at Stoughton, in the county of Norfolk and State of Massachusetts, have invented certain new and useful Improvements in Varnish and Processes of Making Same, of which the following is a specification.

This invention relates to the preparation of varnishes, and is based on the discovery that the resin known in the trade as "Australian kino," when combined with the product obtained by evaporating waste sulfite liquor, the resin and the sulfite pitch being dissolved in a suitable common solvent, produces a varnish capable of yielding films having desirable characteristics. The material referred to herein as kino is not to be confused with water-soluble tanning extracts which are sometimes designated by the same name: it is a resin of reddish color, which is insoluble in water, in fixed oils or in turpentine, but soluble in alcohol and in alkaline solutions of soda, potash, ammonia, etc. When destructively distilled, it yields phenolic bodies having an odor suggesting cresol. This resin when dissolved in alcohol and applied to a surface dries to a varnish film which, while commercially available for many purposes, is brittle.

Waste sulfite liquor is the effluent from the digesters in the sulfite process of making pulp, and the material which I use as a component of the varnish is the product which results from the evaporation to dryness of this waste sulfite liquor, such product being known in the trade as "sulfite pitch." This sulfite pitch may be used in the bleached condition if desired.

I have found that kino resin is soluble in mixtures containing 70 per cent. of ethyl or methyl alcohol, and 30 per cent. of water; and also that evaporated or concentrated waste sulfite liquors, as well as sulfite pitch, are likewise soluble in such 70 per. cent. alcoholic mixtures. I have also found that the resin and the pitch can be simultaneously dissolved in 70 per cent. alcohol; and that they can be dissolved separately in 70 per cent. alcohol and the solutions subsequently mixed, yielding a homogeneous solution. I have further found that the resin can be dissolved in alcohol stronger than 70 per cent., and the pitch in alcohol of less than 70 per cent. concentration, or even in water without any alcohol, and the resin and pitch solutions can then be combined to form a satisfactory and homogeneous varnish, provided that the percentage of alcohol in the resulting mixture does not fall appreciably below 70 per cent. Solutions thus prepared are suitable for use for varnish and other purposes, and the films produced by their evaporation have a high degree of flexibility as compared with those consisting solely of the kino resin.

The relative proportions of kino and pitch in the varnish composition may vary widely, and the invention is not restricted to their use in any definite relative proportions.

I claim:—

1. A composition adapted for use as a varnish, containing kino resin, the solid constituents of waste sulfite liquor, and a common solvent for said resin and sulfite liquor constituents.

2. A composition adapted for use as a varnish, containing kino resin, the solid constituents of waste sulfite liquor, and a common solvent for said resin and sulfite liquor constituents, said solvent comprising a mixture of alcohol and water.

3. A composition adapted for use as a varnish, containing kino resin and sulfite pitch, in solution in alcohol of approximately 70 per cent. concentration.

4. A process of preparing a varnish, which consists in dissolving kino resin in alcohol of more than 70 per cent. concentration, dissolving sulfite pitch in a solvent containing less than 70 per cent. of alcohol, and combining the solutions in proportion to form a homogeneous varnish composition.

5. A process of preparing a varnish, which consists in dissolving kino resin in alcohol of more than 70 per cent. concentration, dissolving sulfite pitch in a solvent containing less than 70 per cent. of alcohol, and combining the solutions in such proportion that the resulting solvent contains approximately 70 per cent. of alcohol.

In testimony whereof I affix my signature in presence of two witnesses.

MICHAEL F. COUGHLIN.

Witnesses:
HARRY S. MORK,
CARL F. WOODS.